US007926196B2

(12) United States Patent
Mueller et al.

(10) Patent No.: US 7,926,196 B2

(45) Date of Patent: Apr. 19, 2011

(54) PIPE GUIDE ADAPTER

(76) Inventors: Frederick Harold Mueller, San Angelo, TX (US); Michael Alvis Lee, San Angelo, TX (US); Douglas Ray Diebold, Fort Gibson, OK (US)

( * ) Notice: Subject to any disclaimer, the term of this patent is extended or adjusted under 35 U.S.C. 154(b) by 4 days.

(21) Appl. No.: 12/538,148

(22) Filed: Aug. 9, 2009

(65) Prior Publication Data

US 2011/0030231 A1 Feb. 10, 2011

(51) Int. Cl.
*G01B 3/14* (2006.01)

(52) U.S. Cl. ........................................... 33/529; 33/562

(58) Field of Classification Search .................... 33/529, 33/562

See application file for complete search history.

(56) References Cited

U.S. PATENT DOCUMENTS

| | | | | |
|---|---|---|---|---|
| 724,185 | A * | 3/1903 | Hughes | 33/529 |
| 3,209,459 | A * | 10/1965 | Fish, Jr. | 33/562 |
| 4,653,195 | A * | 3/1987 | Esparza | 33/529 |
| D319,794 | S * | 9/1991 | Elkins | D10/68 |
| 5,450,677 | A * | 9/1995 | Casey | 33/529 |
| 6,209,215 | B1 * | 4/2001 | Helms | 33/529 |
| 7,251,902 | B1 * | 8/2007 | Mueller | 33/562 |

* cited by examiner

*Primary Examiner* — Yaritza Guadalupe-McCall

(74) *Attorney, Agent, or Firm* — Michael A. Rahman, Esq.; Storm LLP

(57) ABSTRACT

A pipe guide adapter adds marking slots and marking edges to a pipe guide. The pipe guide adapter includes two body sections joined by a hinge enabling the pipe guide adapter to be in open and closed positions. The body sections each include a gripping end and a marking section. The gripping end has a diameter greater than the diameter of the pipe guide to circumferentially grip a portion of the pipe guide in the closed position and to attach to the pipe guide. A pipe is circumferentially gripped jointly by the pipe guide and the pipe guide adapter. A hinge pin is partially disposed in the hinge and extends beyond the hinge. The hinge pin allows tie pipe guide adapter to be aligned to the pipe guide. The extended portion of the hinge pin acts as a stop and a spacer between the pipe guide adapter and the pipe guide.

15 Claims, 5 Drawing Sheets

PIPE GUIDE ADAPTER

FIELD OF THE INVENTION

This invention relates to pipe marking and cutting tools, and more specifically relates to a pipe guide adapter for marking and cutting tools.

BACKGROUND OF THE INVENTION

Pipe Guides are used to mark pipes in different patterns and angles prior to the pipes being cut. A pipe guide is wrapped around the pipe and a marking chalk or pen is used to mark the pipe. The pipe guide is thereafter removed and the pipe is cut along the mark.

Existing pipe guides may have a flat edge, an angular edge or a saddle-shaped pattern. Existing pipe guides may also have one or more marking slots formed at a particular angle. The marking slots are made by openings in the pipe guide body. The flat edge may be used to mark the pipes at a 90 degree angle to construct a flat top fence. The angular shaped edge may be used to create a fence having an angular top.

The saddle-shaped pattern is often used to cut pipes for a gate. Typically, a vertical gate member of a gate is cut in a saddle-shaped pattern which enables the vertical gate member to support a horizontal gate member. The vertical gate member and the horizontal gate member are generally the same type of pipes used in the fence.

A specific saddle-shaped pattern is configured to support a horizontal gate member (i.e., pipe) having a specific diameter. Thus, a saddle-shaped pattern which supports a horizontal gate member having a first diameter is not suitable to support a vertical gate member having a second diameter. Thus, a pipe guide having a specific saddle-shaped pattern is suitable for supporting a horizontal gate member having a specific diameter. A different pipe guide having another saddle-shaped pattern is needed, if for example, a vertical member with a different diameter is desired.

SUMMARY

A pipe guide adapter adds marking slots and marking edges to a pipe guide. The pipe guide adapter includes two body sections joined by a hinge enabling the pipe guide adapter to be in open and closed positions. The body sections each include a gripping end and a marking section. The gripping end has a diameter greater than the diameter of the pipe guide to circumferentially grip a portion of the pipe guide in the closed position and to attach to the pipe guide. The pipe is circumferentially gripped jointly by the pipe guide and the pipe guide adapter.

The pipe guide adapter includes one or more adapter marking slots formed on the body sections for marking the pipe. The adapter marking slots are formed by creating openings through the marking sections. A material is disposed on the inner wall of the gripping end to enable the pipe guide adapter to firmly attach to the pipe guide and to enable the pipe guide adapter to be easily removed from the pipe guide.

A hinge pin is partially disposed in the hinge and extends beyond the hinge. The hinge pin allows the pipe guide adapter to be aligned to the pipe guide. The extended portion of the hinge pin acts as a stop and a spacer between the pipe guide adapter and the pipe guide.

The pipe guide adapter has a marking end opposite the gripping end. The marking end is shaped to mark the pipe in a pre-determined shape. The marking end may be substantially saddle-shaped to mark the pipe in a saddle pattern. The adapter marking slots are formed at a predetermined angle or shape.

BRIEF DESCRIPTION OF THE DRAWINGS

The foregoing summary, as well as the following detailed description of the invention, will be better understood when read in conjunction with the appended drawings. It should be understood, however, that the invention is not limited to the embodiments shown. In the drawings.

DETAILED DESCRIPTION OF PREFERRED EMBODIMENTS

Figure 1:
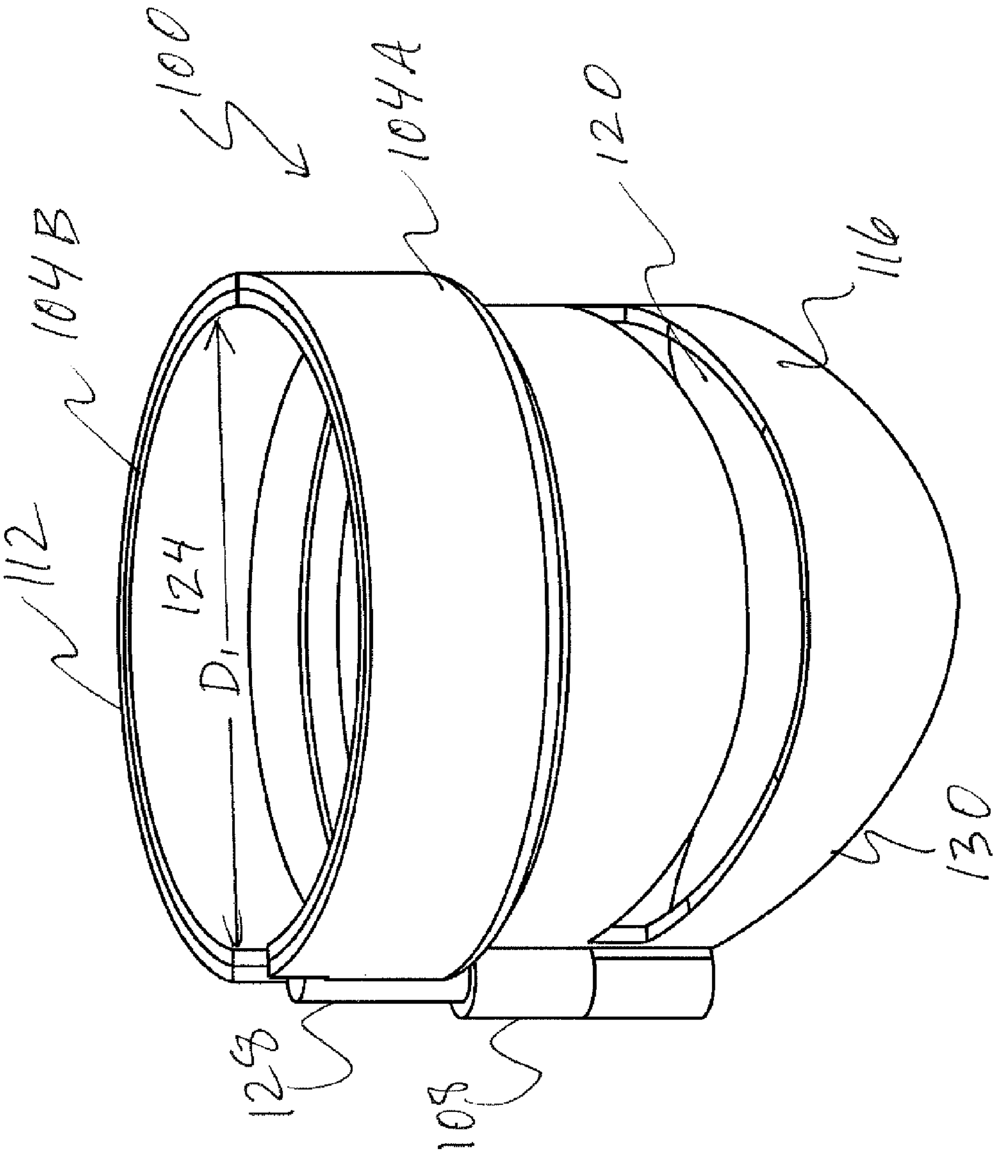
FIG. 1 illustrates a pipe guide adapter in accordance with one embodiment.

FIG. 1 illustrates a pipe guide adapter 100 in accordance with one embodiment. The pipe guide adapter 100 is configured to add marking slots and marking edges to a pipe guide (not shown in FIG. 1).

The pipe guide adapter 100 includes body sections 104A and 104B. The body sections 104A and 104B are joined by a hinge 108, which enables the pipe guide adapter 100 to be in open and closed positions. The body sections 104A and 104B each have a gripping end 112 and a marking section 116. The gripping end 112 has a diameter D1 greater than the diameter of the pipe guide to circumferentially grip a portion of the pipe guide in the closed position and to attach to the pipe guide. The pipe will be circumferentially gripped jointly by the pipe guide and the pipe guide adapter 100.

The body sections 104A and 104B each include one or more adapter marking slots 120 for marking the pipe. The adapter marking slots 120 are formed by creating openings through the marking section 116.

A material 124 is disposed on the inner wall of the gripping end. The material 124 enables the pipe guide adapter 100 to firmly attach to the pipe guide. In one implementation, the material 124 is magnetic rubber that enables the pipe guide adapter 100 to firmly attach to the pipe guide.

A hinge pin 128 is partially disposed in the hinge 108 and extends beyond the hinge 108. The hinge pin 128 is configured to align the pipe guide adapter 100 to the pipe guide.

The pipe guide adapter 100 has a marking end 130 opposite the gripping end 112. The marking end 130 is shaped to mark the pipe in a pre-determined pattern. In one implementation, the marking end is substantially saddle-shaped to mark the pipe in a saddle pattern. The adapter marking slots 120 can be formed at a predetermined angle to allow the pipe to be marked accordingly. Alternatively, the adapter marking slots 120 may be saddle-shaped to mark the pipe in an alternate saddle pattern.

Figure 2:
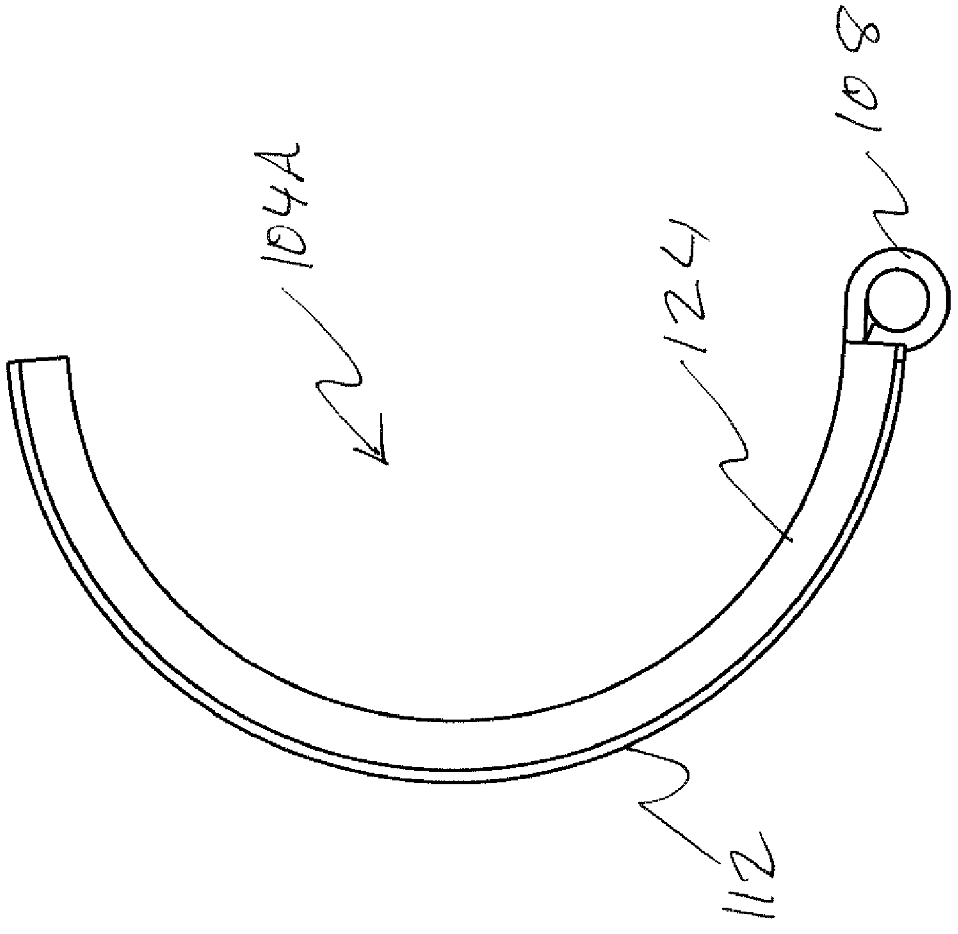
FIG. 2 illustrates the gripping end of a body section.

FIG. 2 illustrates the gripping end 112 of the body section 104A. The magnetic material 124 (e.g., magnetic rubber) is disposed on the inner surface of the body section 104A to enable the pipe guide adapter 100 to grip the pipe guide (not shown in FIG. 2). The hinge 108 is configured to receive the hinge pin which allows the two body sections 104A and 104B to be joined and to be opened and closed about the hinge 108.

Figure 3:
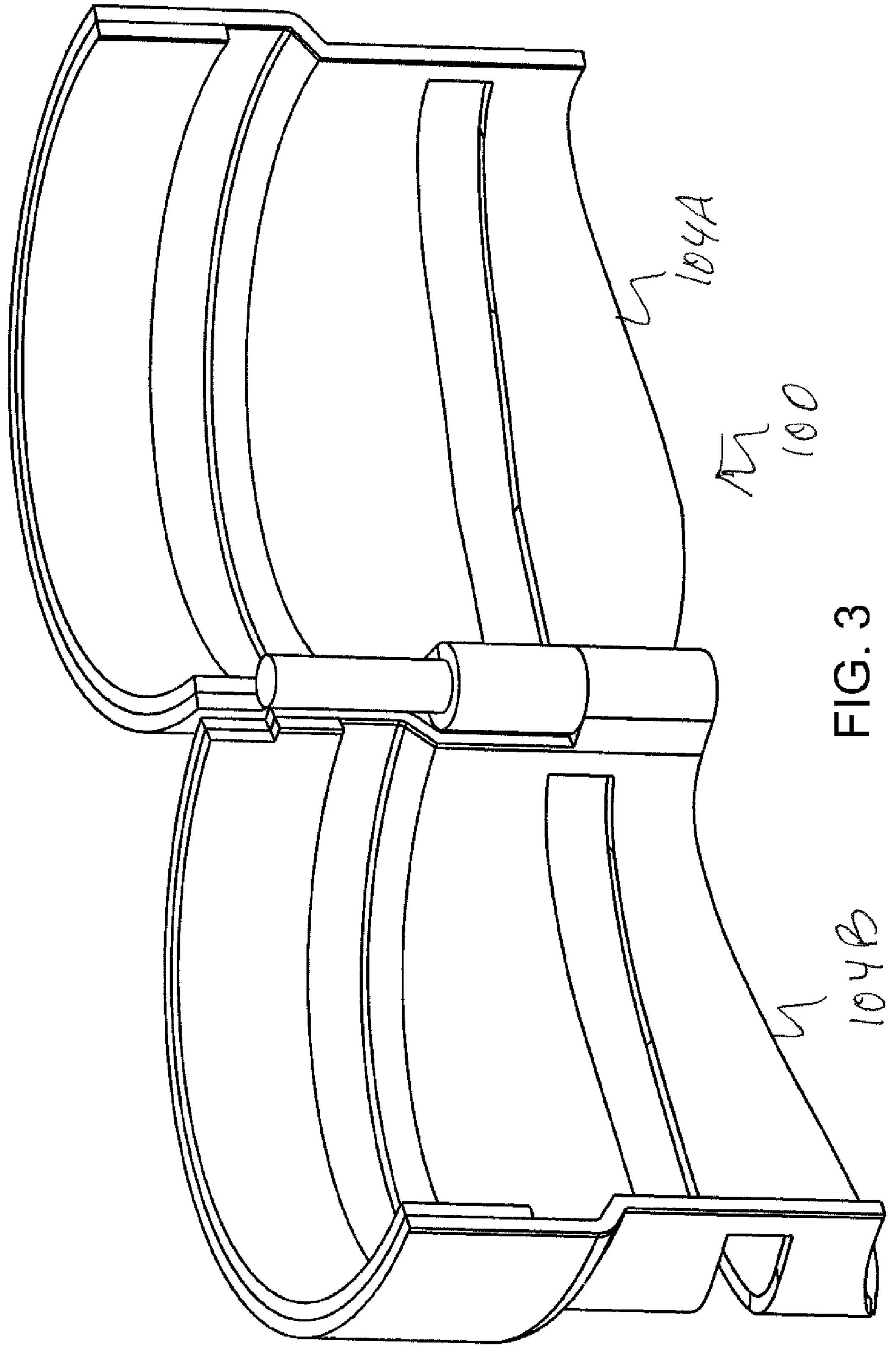
FIG. 3 shows the pipe guide adapter in an open position.
Figure 4:
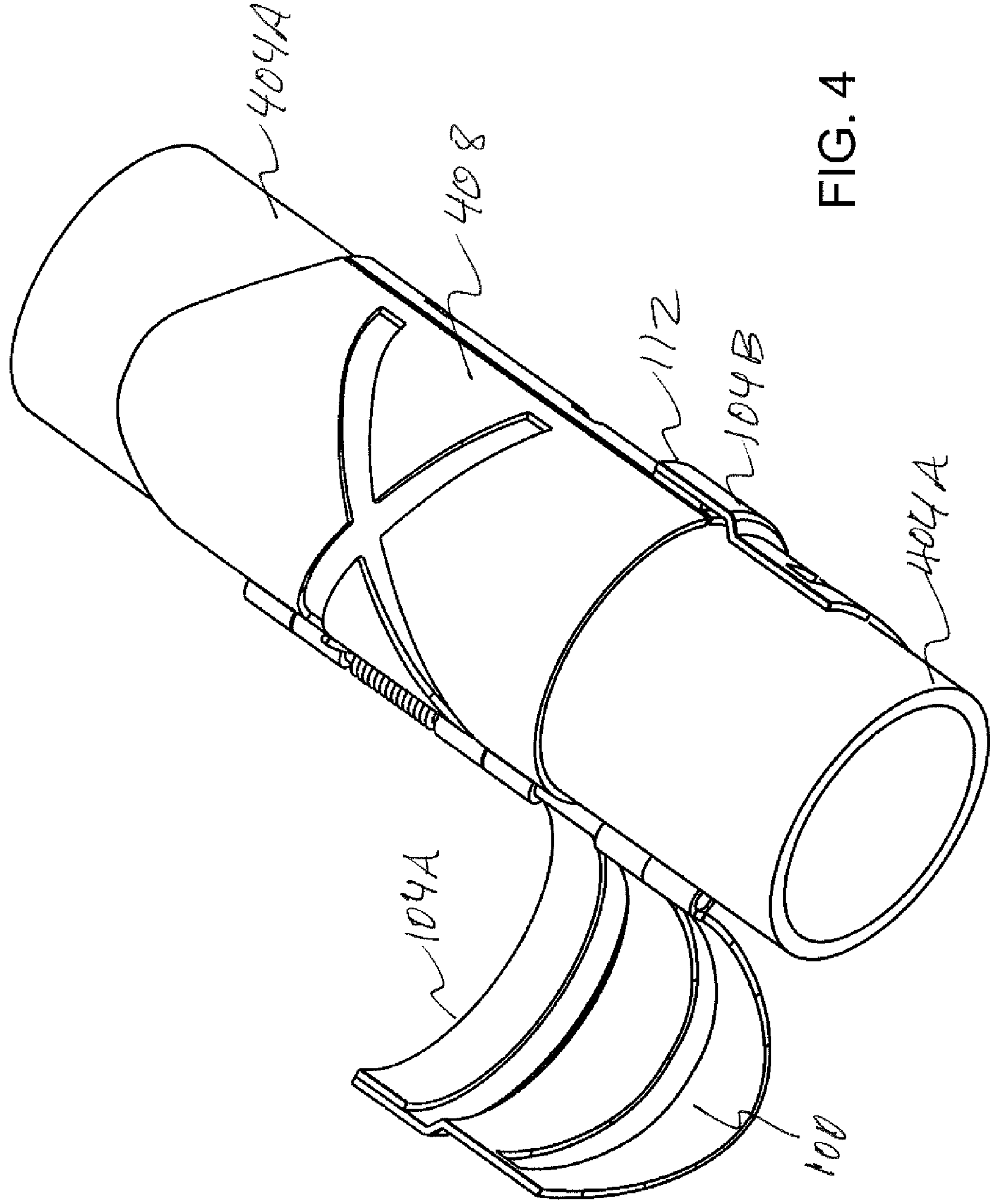
FIG. 4 shows the pipe guide adapter in an open position partially wrapped around a pipe and a pipe guide.
Figure 5:
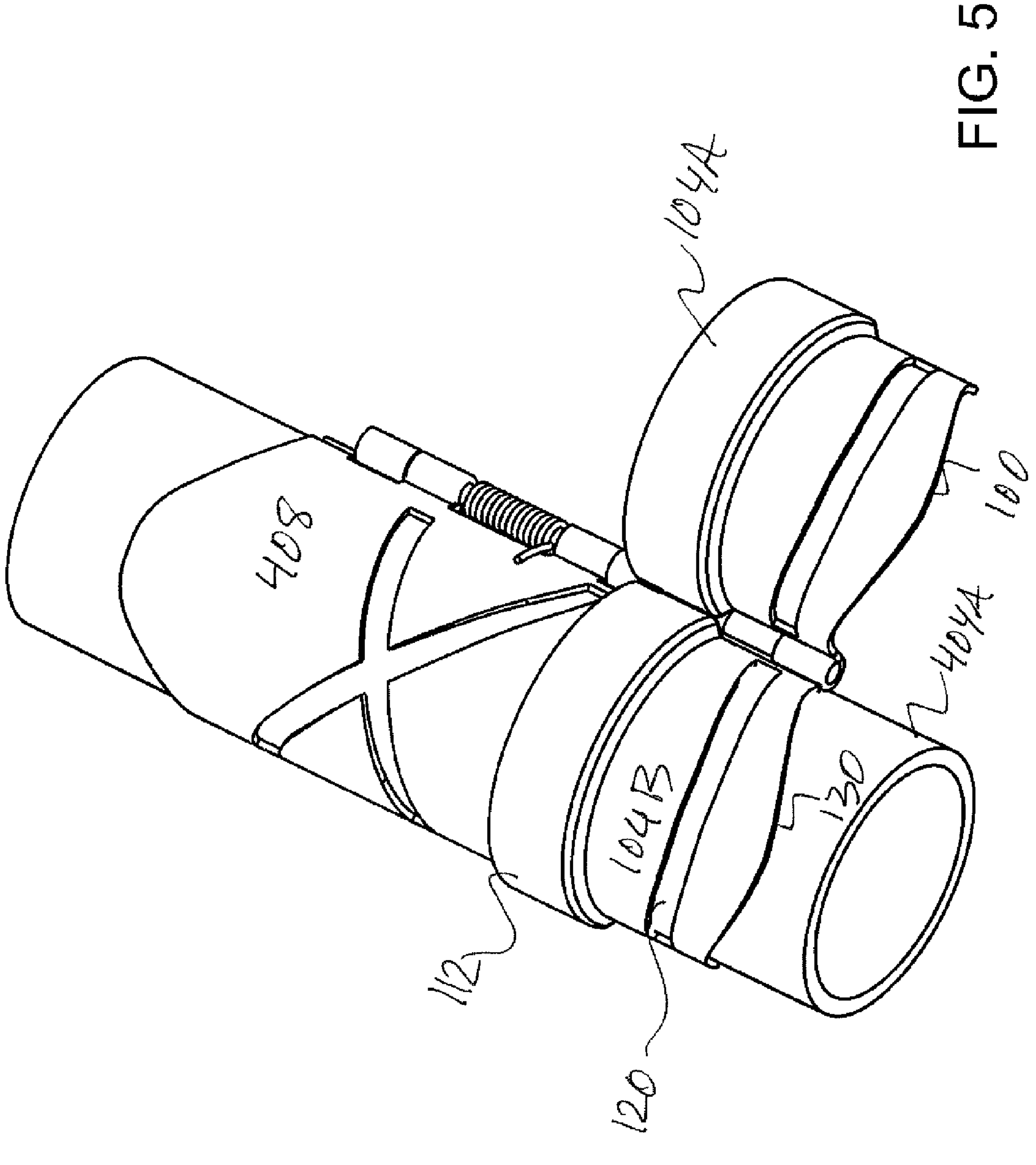
FIG. 5 shows another view of the pipe guide adapter partially wrapped around the pipe guide and the pipe.

FIG. 3 shows the pipe guide adapter 100 in an open position. FIG. 4 shows the pipe guide adapter 100 in an open position partially wrapped around a pipe 404A and a pipe guide 408. The pipe guide 408 is wrapped around the pipe 404A. The body section 104A is shown in an open position while the body section 104B is wrapped around the pipe guide 408 and the pipe 404A. As can be seen, the gripping end 112 is partially wrapped around the pipe guide 408. FIG. 5 shows another view of the pipe guide adapter 100 partially wrapped around the pipe guide 408 and the pipe 404A. When in a closed position, the marking slot 120 is used to mark the pipe 404A. The marking end 130 is also used to mark the pipe 404A.

It will thus be appreciated that the pipe guide adapter 100 attaches to the pipe guide 408 to provide one or more marking slots and a marking end. The pipe guide adapter 100 allows the pipe 404A to be marked at different angles and shapes.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

We claim:

1. A pipe guide adapter for adding marking slots and marking edges to a pipe guide, comprising:

two body sections joined by a hinge enabling the pipe guide adapter to be in open and closed positions, the body sections each having a gripping end and a marking section, the gripping end having a diameter greater than the diameter of the pipe guide to circumferentially grip a portion of the pipe guide in the closed position and to attach to the pipe guide, the pipe being circumferentially gripped jointly by the pipe guide and the pipe guide adapter;

one or more adapter marking slots formed on the body sections for marking the pipe, the adapter marking slots being formed by creating openings through the marking sections;

a material disposed on the inner wall of the gripping end to enable the pipe guide adapter to firmly attach to the pipe guide and to be easily removed from the pipe guide; and a hinge pin partially disposed in the hinge and extending beyond the hinge, the hinge pin aligning the pipe guide adapter to the pipe guide and to act as a stop and a spacer between the pipe guide adapter and the pipe guide.

2. The pipe guide adapter of claim 1, wherein the pipe guide adapter has a marking end opposite the gripping end, the marking end shaped to mark the pipe in a pre-determined shape.

3. The pipe guide adapter of claim 1, wherein the pipe guide adapter has a marking end substantially saddle-shaped to mark the pipe in a saddle pattern.

4. The pipe guide adapter of claim 1, further comprising a magnetic material disposed on the inner wall of the gripping end to firmly attach the pipe guide adapter to the pipe guide and to enable the pipe guide adapter to be easily removed from the pipe guide.

5. The pipe guide adapter of claim 1, wherein the adapter marking slots are formed at a predetermined angle.

6. The pipe guide adapter of claim 1, wherein the adapter marking slots are saddle-shaped to mark the pipe in a saddle pattern.

7. A pipe guide adapter for adding marking slots and marking edges to a pipe guide, comprising:

two body sections joined by a hinge enabling the pipe guide adapter to be in open and closed positions, the body sections each having a gripping end and a marking section, the gripping end configured to circumferentially grip a portion of the pipe guide in the closed position and to attach to the pipe guide, the pipe being circumferentially gripped jointly by the pipe guide and the pipe guide adapter;

a marking end opposite the gripping end to mark the pipe in a predetermined pattern;

one or more adapter marking slots formed on the body sections for marking the pipe, the adapter marking slots being formed by creating openings through the marking sections;

a material disposed on the inner wall of the gripping end to enable the pipe guide adapter to firmly attach to the pipe guide and to be easily removed from the pipe guide; and a hinge pin partially disposed in the hinge and extending beyond the hinge, the hinge pin aligning the pipe guide adapter to the pipe guide and to act as a spacer and a stop between the pipe guide adapter and the pipe guide.

8. The pipe guide adapter of claim 7, wherein the marking end is substantially saddle-shaped to mark the pipe in a saddle pattern.

9. The pipe guide adapter of claim 7, further comprising a magnetic material disposed on the inner wall of the gripping end to firmly attach the pipe guide adapter to the pipe guide and to enable the pipe guide adapter to be easily removed from the pipe guide.

10. The pipe guide adapter of claim 7, wherein the adapter marking slots are formed at a predetermined angle.

11. The pipe guide adapter of claim 7, wherein the adapter marking slots are saddle-shaped to mark the pipe in a saddle pattern.

12. A cylindrical pipe guide adapter for adding marking slots and marking edges to a pipe guide, comprising:

two body sections joined by a hinge enabling the pipe guide adapter to be in open and closed positions, the body sections each having a gripping end and a marking section, the gripping end having a diameter greater than the diameter of the pipe guide to circumferentially grip a portion of the pipe guide in the closed position and to attach to the pipe guide, the pipe being circumferentially gripped jointly by the pipe guide and the pipe guide adapter;

a marking end opposite the gripping end to mark the pipe in a saddle pattern;

one or more adapter marking slots formed on the body sections for marking the pipe, the adapter marking slots being formed by creating openings through the marking sections;

a material disposed on the inner wall of the gripping end to enable the pipe guide adapter to firmly attach to the pipe guide and to be easily removed from the pipe guide; and a hinge pin partially disposed in the hinge and extending beyond the hinge, the hinge pin aligning the pipe guide adapter to the pipe guide and to act as a stop and a spacer between the pipe guide adapter and the pipe guide.

13. The pipe guide adapter of claim 12, further comprising a magnetic material disposed on the inner wall of the gripping end to firmly attach the pipe guide adapter to the pipe guide and to enable the pipe guide adapter to be easily removed from the pipe guide.

14. The pipe guide adapter of claim 12, wherein the adapter marking slots are formed at a predetermined angle.

15. The pipe guide adapter of claim 12, wherein the adapter marking slots are saddle-shaped to mark the pipe in a saddle pattern.

* * * * *